United States Patent Office 3,772,403
Patented Nov. 13, 1973

---

3,772,403
PROCESS FOR PRODUCING AN IMPROVED ANTISTATIC POLYAMIDE FIBER

Rodney Lee Wells, Chester, Va., assignor to Allied Chemical Corporation, New York, N.Y.
No Drawing. Filed May 30, 1972, Ser. No. 257,853
Int. Cl. C08g 41/04
U.S. Cl. 260—857 PG    10 Claims

ABSTRACT OF THE DISCLOSURE

It has been suggested that the utility of synthetic fibers of polyamide could be increased by dispersing in the polyamide about 1 to 12 percent by weight of an antistatic compound represented by the formula:

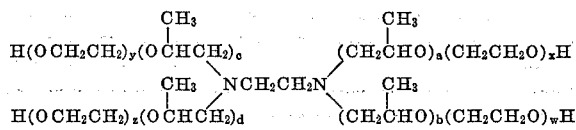

where $a$, $b$, $c$, $d$, $w$, $x$, $y$ and $z$ are each a whole number and the total of $a$, $b$, $c$ and $d$ is between 8 and 850 and the total of $w$, $x$, $y$, and $z$ is between 8 and 1,000.

However, with incorporation of this antistatic additive in the polyamide, serious problems have been encountered in melt-spinning due to the frequent occurrence of "nubs" or enlarged places in the extruded polyamide filament. It has now been found that the occurrence of said nubs in the antistatic polyamide fiber can be greatly reduced by dispersing in the polymer at least 0.5% by weight, based on the weight of the antistatic agent, of a phenol compound represented by the formula:

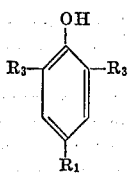

where $R_1$ is hydrogen or an alkyl radical containing 1 to 5 carbon atoms, $R_2$ is an alkyl radical containing 12 to 18 carbon atoms, and $R_3$ is an alkyl radical containing 12 to 18 carbon atoms; and at least 0.5% by weight, based on the weight of the antistatic additive, of a sulfur compound of the formula:

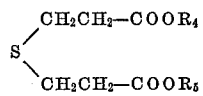

where $R_4$ is an alkyl radical containing 8 to 18 carbon atoms and $R_5$ is an alkyl radical containing 8 to 18 carbon atoms.

---

BACKGROUND OF THE INVENTION

This invention relates to a process for the melt-spinning of a filamentary structure from a synthetic polyamide polymer. More particularly, it is concerned with an improved process for the formation of an improved antistatic filament, yarn or the like by melt-spinning a synthetic linear fiber-forming polyamide.

It has been suggested that the utility of synthetic fibers could be increased and their properties, in particular their antistatic properties, could be improved if a polyalkylene ether of high molecular weight is included in the polymer. More specifically, it is disclosed in U.S. Pat. 3,475,898 to Magat and Sharkey to use poly(ethylene-propylene)ether glycols for this purpose. More recently, U.S. Pat. 3,657,-386 discloses that certain propylene oxide-ethylene oxide copolymers based on ethylene diamine are especially useful in preparation of an antistatic fiber of polyamide.

Polyamide fibers containing propylene oxide-ethylene oxide copolymers based on ethylene diamine have been prepared but serious problems were encountered in melt-spinning due to the frequent occurrence of "nubs" on the fiber. The term "nubs" is conventionally applied and is used herein to mean enlarged sections of filament no more than several filament diameters in length. Nubs may be formed by a foreign, non-orientable substance which interferes with normal fiber stretch in a short section, resulting in an enlargement. Foreign substances which are believed to have contributed to nubs in the present instance include carbonized polymer from face of extruder die and spinnerette, and gels formed in the polymer. Gels appear to be the chief cause, i.e., the nubs are probably created by non-orientable gel from cross-linked polymer. Thermal degradation of the polymer may be an important causative factor.

The reactions in thermal degradation of polyamides containing polyalkylene ether additives are not entirely understood. It is likely that thermal degradation produces a decomposition product which serves to form cross-links between amide groups and adjacent polymer chains. The decomposition reaction proceeds slowly, finally building up a three-dimensional network of molecules which may be called polymer gel and which eventually reaches the stage where it forms an infusible coating on the walls of the reactor and other equipment.

A serious difficulty which arises from the formation of this polymer gel on the interior walls is that from time to time pieces break off and get into the flowing polymer stream where they produce damage to the spinning equipment.

The greatest difficulty, however, is caused by polymer gel which has progressed to the three-dimensional structural stage, but which has not yet reached the stage of being infusible. This kind of polymer gel is readily carried with the stream of flowing polymer. Being still molten or at least softened, it passes through the pump and even through the filter medium to show up either as discontinuities or as viscosity differences in the spun filament. When these filaments are later cold drawn, these defects may cause breaks in the filaments which either cause the whole thread to break or else form nubs which go through to be counted as quality defects in the final yarns.

SUMMARY OF THE INVENTION

It is an object of this invention to avoid the above difficulties by minimizing gel formations in the molten polyamide. Another object is to avoid accumulation of polymer gel on the walls of the reservoir, in the pump, or in the filtering medium when melt-spinning the polyamide. A further object is to improve the uniformity and quality of filaments or fibers formed from the molten polymer; in particular to minimize nub formation in the filaments. Other objects will become apparent from the disclosure and the appended claims.

These objects are accomplished by the present invention which provides an improvement in the process for the formation of an antistatic polyamide fiber from a fiber-forming polyamide polymer containing 1 percent to 12 percent by weight of an antistatic compound represented by the formula:

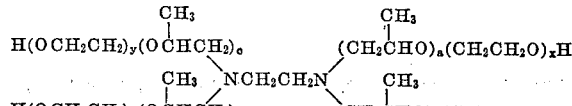

where $a$, $b$, $c$, $d$, $w$, $x$, $y$ and $z$ are each a whole number and the total of $a$, $b$, $c$ and $d$ is between 8 and 850 and the total of $w$, $x$, $y$ and $z$ is between 8 and 1,000; by extruding the molten polymer through an orifice into a quenching medium and thereafter stretching the resulting filaments, the improvement comprising dissolving in the extrudate prior to extrusion at least 0.5 percent by weight, preferably 0.5 to 8 percent, based on the weight of the antistatic compound, of a phenol compound of the formula:

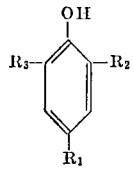

wherein $R_1$ is hydrogen or an alkyl radical containing 1 to 5 carbon atoms, $R_2$ is an alkyl radical containing 12 to 18 carbon atoms, and $R_3$ is an alkyl radical containing 12 to 18 carbon atoms; and at least 0.5 percent by weight, preferably 0.5 to 8 percent, based on the weight of the antistatic compound, of a sulfur compound of the formula:

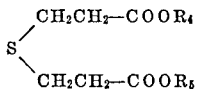

where $R_4$ is an alkyl radical containing 8 to 18 carbon atoms and $R_5$ is an alkyl radical containing 8 to 18 carbon atoms.

As indicated hereinabove, the present invention may be considered an improvement over the disclosure of U.S. Pat. 3,657,386 which is directed to an antistatic polyamide fiber containing propylene oxide-ethylene oxide copolymers based on ethylene diamine. The alkylated phenol compounds useful in the present invention are known compounds and some are commercially available. The alkylation of phenols is readily conducted with a variety of catalysts and alkylating agents; see Price, Organic Reactions III, 58 (1946). The preparation of 2,6-dialkylphenols by direct alkylation is relatively difficult but a procedure is furnished in Journal of Organic Chemistry, 21, 712 (1956). The sulfur compounds of the invention may be prepared in accordance with Chemical Abstracts, 64, 3362C, and U.S. Pat. 2,762,836 is also pertinent.

DESCRIPTION OF THE PREFERRED EMBODIMENTS

The invention will now be further described in the following specific examples which are to be regarded solely as illustrative and not as restricting the scope of the invention.

Example 1

A glass reactor equipped with a heater and stirrer was charged with a mixture of 1520 grams of ε-caprolactam and 80 grams of aminocaproic acid. The mixture was then flushed with nitrogen and was stirred and heated to 255° C. over a 1 hour period at atmospheric pressure to produce a polymerization reaction. The heating and stirring was continued at atmospheric pressure under a nitrogen sweep for an additional 4 hours in order to complete the polymerization. During the last 30 minutes of the polymerization, 6.4 grams of aqueous 50 percent $TiO_2$ dispersion, 1.7 grams of 2,6-dioctadecyl-p-cresol, 1.0 gram of distearylthiodipropionate and 48 grams of an antistatic agent having the formula:

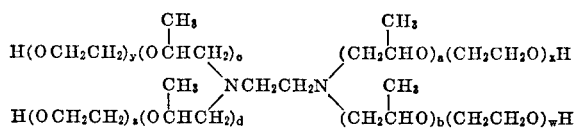

a molecular weight of 27,000 and the ethylene oxide moiety making up of 80 percent of the molecular weight, were added to the polycaproamide and stirring was continued to thoroughly mix the additives throughout the polymer. Nitrogen was then admitted to the glass reactor and a small pressure was maintained while the polymer was extruded from the glass reactor in the form of a polymer ribbon. The polymer ribbon was subsequently cooled, pelletized, washed and then dried. The polymer was a white solid having a relative viscosity of about 55 as determined by a concentration of 11 grams of polymer in 100 milliliters of 90 percent formic acid at 25° C. (ASTMD-789-62T).

The polycaproamide pellets containing the antistatic agent and other additives were melted at about 285° C. and then melt-extruded under a pressure of about 1500 p.s.i.g. through a 16-orifice spinnerette, each of the orifices having a diameter of 0.014 inch, to produce a 250-denier fiber. The fiber was then collected at about 1,000 feet per minute and was drawn about 3.5 times its extruded length to produce a 70-denier yarn. For convenience, this yarn hereinafter will be called Yarn A. A control yarn containing the antistatic agent but no additional additives was produced in the same manner as described above. For convenience, this yarn hereinafter will be called Yarn B. A second control yarn containing no antistatic compound, no phenol compound and no sulfur compound was produced in the same manner as described above; for convenience, this yarn hereinafter will be called Yarn C.

Yarn A, Yarn B and Yarn C were woven into conventional plain weave fabrics. The fabrics were cut into fabric test samples having a width of 3 inches and a length of 9 inches. The fabric samples were tested for their antistatic property in accordance with the general procedure described in the Technical Manual of the American Association of Textile Chemists and Colorists, 1969 edition, volume 45, at pages 206-207. This test procedure is entitled "Electrostatic Clinging of Fabrics: Fabric to Metal Test" and is numbered AATCC 115-1969. In accordance with this test, Yarn C showed poor antistatic properties, i.e., the average time for fabric samples to decling from metal completely on their own was over 300 seconds after 5 to 25 wash cycles. In contrast, Yarn A and Yarn B both showed excellent antistatic properties, for example, average time for fabric samples to decling from metal completely on their own was about 130 seconds after 25 wash cycles. In color, Yarn A was pale yellow, Yarn B was deep yellow and Yarn C was relatively white. Yarn A, Yarn B and Yarn C were also tested for the number of nubs per pound as shown in Example 2.

Example 2

This example outlines the method used for locating, identifying and calculating the nubs per pound in Yarn A, Yarn B and Yarn C as prepared in Example 1. In this method a nub is defined as an enlarged place in a filament, which is usually caused by a particle of gelled polymer. This method may be used for either monofilament or multifilament yarns; however, it is not applicable to most types of crimped yarn.

In accordance with the test, the 70-denier yarn is drawn directly from the package by means of an air aspirator and is passed through an opening of known width, specifically, 0.0030 inch in width. Such an opening is conviently provided by use of ceramic cleaner gap, which is well-known in the art. The presence of a nub is detected when it stops the yarn passage through the opening. The filaments are separated and the cause of the yarn stopping identified as a nub or as the twisted end of a broken filament. For representative results, about 75 grams is passed through the gap and the number of nubs counted. Table I below shows the results of testing on Yarn A, Yarn B, and Yarn C.

TABLE I

Determination of nubs per pound

| Sample: | Nub count per pound of yarn |
|---|---|
| Yarn A | 3,100 |
| Yarn B | 16,000 |
| Yarn C | 2,300 |

It will be noted that polyamide yarn made without additives had a relatively low nub count of 2,300 nubs per pound of yarn. Addition of the antistatic compound to the polyamide caused the nub count to increase to 16,000 per pound of yarn. However, the addition of the antistatic compound plus the phenol compound and the sulfur compound of the invention reduced the nub count to 3,100 nubs per pound of yarn.

Example 3

The procedure of Example 1 (Yarn A) was followed except that the various additives were charged with the caprolactam initially. The antistatic fiber produced was a pale yellow and the nub count was only 3165 per pound of yarn.

Example 4

The procedure of Example 1 (Yarn A) was followed except that the antistatic additive was charged with the caprolactam but no phenol compound and no sulfur compound was added. The antistatic fiber produced was a deep yellow and had a high nub count of 16,200 nubs per pound of yarn.

Example 5

The procedure of Example 1 (Yarn A) was followed except that the antistatic compound (Tetronic 1504, BASF-Wyandotte) had the structure:

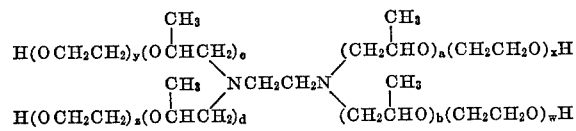

but its molecular weight was 12,500 and the ethylene oxide moiety made up 40% of the molecular weight. Sixty grams of the antistatic compound was added together with 1.13 grams of 2,6-dihexadecyl-p-cresol, 0.67 gram of dilaurylthiodipropionate and 6.4 grams of 50% aqueous $TiO_2$ dispersion. The fiber color was pale yellow and the nub count was 3125 per pound of yarn.

Example 6

The procedure of Example 1 (Yarn A) was followed except that 90 grams of the antistatic additive of Example 5 was used together with 1 gram of dilaurylthiodipropionate and 4 grams of 2,6-dioctodecyl-p-cresol. The fiber produced was pale yellow and had a low nub count of 3300 nubs per pound of yarn.

Discussion:

In additional tests it was determined that the molecular weight of the antistatic compound is preferably between about 4,000 and about 50,000, the ethylene oxide moieties making up about 20% to about 80% of the molecular weight of said compound. Preferably, the antistatic fiber contains from about 2% to about 8% of the antistatic compound.

By "antisatic" fiber is meant fibers that will pass the cling test and the shuffle test as described in U.S. Pat. 3,657,386. By "fiber" is meant multifilament yarn, monofilament, and all the known physical forms of synthetic fibers. By "polyamide" is meant the polymers made by condensation of diamines with dibasic acids or by polymerization of lactams or amino acids, resulting in a synthetic resin characterized by the recurring group

—CONH—.

By "ethylene oxide moiety" is meant the portion of the chemical molecule —$(CH_2CH_2O)$—.

Desirably, the antistatic compound and the other additives are substantially uniformly dispersed in the polyamide. The additives are particularly effective when the antistatic additive is charged at the beginning of polymerization. Preferably, the weight ratio of the phenol compound to sulfur compound is between 0.25 and 4.0.

I claim:

1. In a process for the formation of an antistatic polyamide fiber from a fiber-forming polyamide polymer containing 1 percent to 12 percent by weight of an antistatic compound represented by the formula:

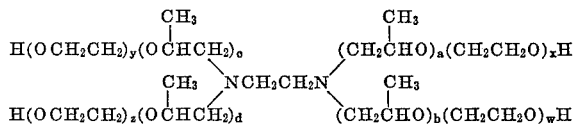

where $a$, $b$, $c$, $d$, $w$, $x$, $y$ and $z$ are each a whole number and the total of $a$, $b$, $c$ and $d$ is between 8 and 850 and the total of $w$, $x$, $y$ and $z$ is between 8 and 1,000, said antistatic compound having a molecular weight between about 4,000 and about 50,000, and said ethylene oxide moieties making up about 20% to about 80% of said antistatic compound, by extruding the molten polymer through an orifice into a quenching medium and thereafter stretching the resulting filament, the improvement comprising dissolving in the extrudate prior to extrusion at least 0.5 percent by weight, based on the weight of the antistatic compound, of a phenol compound of the formula:

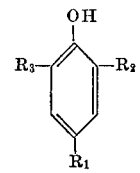

where $R_1$ is hydrogen or an alkyl radical containing 1 to 5 carbon atoms, $R_2$ is an alkyl radical containing 12 to 18 carbon atoms, and $R_3$ is an alkyl radical containing 12 to 18 carbon atoms; and at least 0.5 percent by weight, based on the weight of the antistatic compound, of a sulfur compound of the formula:

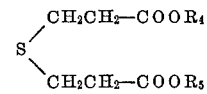

where $R_4$ is an alkyl radical containing 8 to 18 carbon atoms and $R_5$ is an alkyl radical containing 8 to 18 carbon atoms, thereby reducing the occurrence of nubs in the fiber.

2. The process of claim 1 wherein 0.5% to 8% by weight of the phenol compound and 0.5% to 8% by weight of the sulfur compound are incorporated into the fiber, based on the weight of the antistatic compound.

3. The process of claim 2 wherein the weight ratio of the phenol compound to the sulfur compound is between 0.25 and 4.0.

4. The process of claim 3 wherein the molecular weight of the antistatic compound is about 27,000 and the ethylene oxide moieties make up about 80% of the molecular weight of the antistatic compound, the phenol compound is 2,6-dioctadecyl-p-cresol, and the sulfur compound is distearylthiodipropionate.

5. The process of claim 3 wherein the molecular weight of the antistatic compound is about 12,500 and the ethylene oxide moieties make up about 40% of the molecular weight of the antistatic compound, the phenol compound is 2,6-dihexadecyl-p-cresol, and the sulfur compound is dilaurylthiodipropionate.

6. An antistatic polyamide fiber having less than $4 \times 10^3$ nubs per pound of fiber, said fiber containing 1 percent to 12 percent by weight of an antistatic compound represented by the formula:

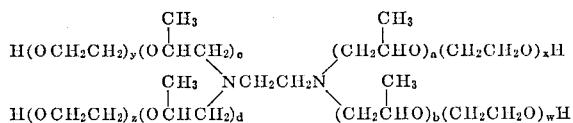

wherein $a$, $b$, $c$, $d$, $w$, $x$, $y$ and $x$ are each a whole number and the total of $a$, $b$, $c$ and $d$ is between 8 and 850 and the total of $w$, $x$, $y$ and $z$ is between 8 and 1,000, and wherein the molecular weight of said antistatic compound is between about 4,000 and about 50,000, said ethylene oxide moieties making up about 20% to about 80% of the molecular weight of said compound; at least 0.5 percent by weight, based on the weight of the antistatic compound, of a phenol compound of the formula:

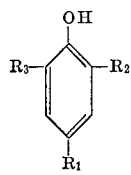

where $R_1$ is hydrogen or an alkyl radical containing 1 to 5 carbon atoms, $R_2$ is an alkyl radical containing 12 to 18 carbon atoms, and $R_3$ is an alkyl radical containing 12 to 18 crbon atoms; and at least 0.5 percent by weight, based on the weight of the antistatic compound, of a sulfur compound of the formula:

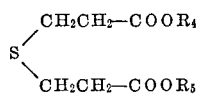

where $R_4$ is an alkyl radical containing 8 to 18 carbon atoms and $R_5$ is an alkyl radical containing 8 to 18 carbon atoms.

7. The fiber of claim 6 wherein 0.5% to 8% by weight of the phenol compound and 0.5% to 8% by weight of the sulfur compound are incorporated into the fiber, based on the weight of the antistatic compound.

8. The fiber of claim 7 wherein the weight ratio of the phenol compound to the sulfur compound is between 0.25 and 4.0.

9. The fiber of claim 8 wherein the molecular weight of the antistatic compound is about 27,000 and the ethylene oxide moieties make up about 80% of the molecular weight of the antistatic compound, the phenol compound is 2,6-dioctadecyl-p-cresol, and the sulfur compound is distearylthiodipropionate.

10. The fiber of claim 8 wherein the molecular weight of the antistatic compound is about 12,500 and the ethylene oxide moieties make up about 40% of the molecular weight of the antistatic compound, the phenol compound is 2,6-dihexadecyl-p-cresol, and the sulfur compound is diluarylthiodipropionate.

References Cited
UNITED STATES PATENTS

| | | | |
|---|---|---|---|
| 2,922,773 | 1/1960 | Coler | 260—32.6 |
| 3,386,942 | 6/1968 | Bell | 260—45.9 |
| 3,657,386 | 4/1972 | Weedon | 260—857 PG |

PAUL LIEBERMAN, Primary Examiner

U.S. Cl. X.R.

260—37 N, 45.7 S, 45.85, 45.95 H; 264—210 F